GAP LENGTH-LIMITED SATURATION DEPTH RECORDING

Filed Aug. 10, 1965

INVENTORS
RAYMOND A. BARBEAU
REX C. BRADFORD
NORMAN R. FRAIM
DONALD E. LOCKETT

BY John F. Osterndorf

ATTORNEY

United States Patent Office 3,449,756

Patented June 10, 1969

3,449,756

GAP LENGTH-LIMITED SATURATION DEPTH RECORDING

Raymond A. Barbeau, Poughkeepsie, Rex C. Bradford, Wappingers Falls, and Norman R. Fraim and Donald E. Lockett, Poughkeepsie, N.Y., assignors to International Business Machines Corporation, Armonk, N.Y., a corporation of New York Filed Aug. 10, 1965, Ser. No. 478,700
Int. Cl. G01d *15/12;* G11b *5/00*
U.S. Cl. 346—74 4 Claims

ABSTRACT OF THE DISCLOSURE

A system for recording binary coded digital information on a magnetic record medium at densities higher than that density which the medium is practicably capable of storing under full thickness saturation-type recording conditions. The apparatus includes a recording head having a transducing gap substantially smaller than the thickness of the recording surface and operable to limit the depth of saturation in the recording surface that currents supplied to the head are capable of producing, to a depth less than the full thickness of the recording surface. This gap length-limited saturation depth recording is accomplished with the recording head currents of the full magnitude necessary to provide a substantial maximum output signal during the playback.

This invention relates to recording apparatus and, more particularly, to apparatus for recording binary coded digital information at high densities on a magnetizable medium.

In the past, it has been proposed that recording of binary coded digital information at densities above 800 flux changes per inch be performed by altering conventional recording systems which use standard oxide tape (.0005 inch thickness) and wide-gap magnetic heads (approximately 500 microinches in length.) The alternation made has been to control the saturation of the recording system. This has been accomplished by reducing and varying the amplitude of the current applied to the recording head write coil to produce flux densities in the magnetic medium at levels less than the saturation level. The result of this type of recording has inherent disadvantages. It results in a reduction in the effectiveness signal-to-noise ratio of the electrical signals derived during the readout of information from the tape. Moreover, the use of this type of recording has also resulted in the spreading of the individual digital bits. There is a departure in the phase of the detected signals from a nominal amount which is considerably more than can be accommodated in the recording system.

Another arrangement which has been proposed for increasing the packing density of the recorded information in order to minimize the space required for the storage of a large quantity of digital information has been to employ bias circuitry in the recording system. The bias may either be of the alternating current or direct current type, or a combination of both of them such as is known in the analog type of recording systems. In systems of this type, however, high frequency bias supplies that are extremely costly must be employed. In addition, a netural tape is required in order to accomplish high-density information storage, thus necessitating the use of erase heads to neutralize the tape before recording can be performed.

A third approach suggested for increasing the storage densities has been to use very thin magnetic media so that the magnetic fields corresponding to each of the recorded bits on the magnetic medium is more or less confined. Although such an arrangement has been found to be operable and satisfactory, it is not practicable for the systems employing conventional tape. It requires that a different type of recording tape from the conventional be employed. As is well known, conventional tape accounts for a very substantial portion of the recording media presently being employed in digital computing systems.

Accordingly, it is a primary object of the invention to provide recording apparatus for a accomplishing high density recording of information on conventional magnetic tape.

It is another object of the invention to accomplish high density recording of digital information on standard-thickness oxide tape by controlling the extent of magnetic field saturation of the recording medium.

It is a further object of the invention to provide recording apparatus for accomplishing high density recording of digital information on standard-thickness oxide tape, in which the recording and derivation of the digital information signals is accomplished with an increased degree of reliability over that known in other systems.

A still further object of the invention is to provide phase modulated recording apparatus for use with standard-thickness oxide tape which can accomplish the recording of binary coded digital information at various high densities by merely altering the frequency of the write signal applied to the apparatus.

In accordance with an aspect of the invention, there is provided recording apparatus which may be of the non-return to zero encoding type. There is provided in the apparatus a recording medium such as a magnetic tape that is moved relative to a recording station. At the recording station, means are provided for accomplishing controlled saturation recording on the medium. The means include a recording head formed of magnetic pole pieces which define a transducing gap, and means coupled to the recording head for applying a signal indicative of the digital information to be recorded to generate magnetic flux at the gap. The head is characterized by having a predetermined relationship between the length of the transducing gap and the thickness of the recording medium so that the gap length is substantially smaller than the thickness of the medium controlling the fringing of the generated flux and, therefore, the extent of saturation.

Thus, according to one feature of the invention, when standard thickness oxide tape is used as the recording medium which has a thickness of approximately .0005 inch, the length of the transducing gap of the recording head is formed to be in the range of 0.1 to 0.5 and preferably about one-fifth the thickness of the medium.

Another feature of the invention provides for the recording apparatus which may be of the phase encoded type to be operative on the substantially flat portion of an experimentally determined saturation characteristic of the write current applied to the apparatus versus the output signal detected by the recording apparatus; the substantially flat portion of the characteristic being substantially uniform, regardless of the particular high density of storage.

The foregoing and other objects, features, and advantages of the invention will be apparent from the following more particular description of a preferred embodiment of the invention, as illustrated in the accompanying drawings; wherein.

Figure 1:
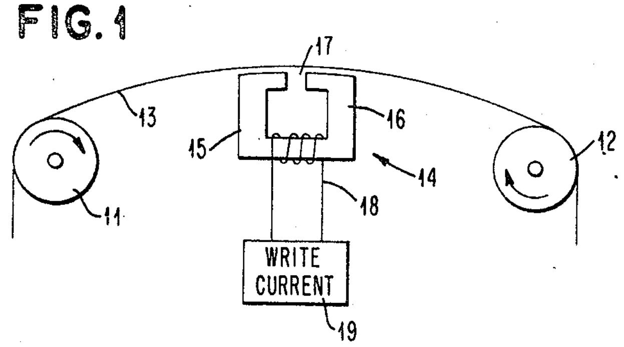
FIG. 1 is a schematic diagram of a magnetic tape transport system incorporating the recording apparatus of the invention.

Referring now to FIG. 1, recording apparatus embodying the principles of the invention for storing binary coded digital information at high densities (above 800 flux changes per inch) is incorporated in tape transport apparatus. The apparatus comprises a pair of capstans 11 and 12. A recording medium, such as a magnetic tape 13, is carried in the direction of the arrows between the capstans and past a recording station. A recording head indicated generally at 14 is located at the recording station. Head 14 comprises magnetic pole pieces 15 and 16 which define a transducing gap 17. The tape 13 in traversing the head 14 may contact the surfaces of the pole pieces 15 and 16 or it may be aerodynamically supported on a thin-air bearing in a manner that is well known in the art.

The recording head 14 may be a single structure or it may be incorporated in a unit with a read-back head and with other transducing means as may be necessary. However, for purposes of illustrating this invention, the recording head only is shown.

An electrical coil 18 is suitably wound on the head structure and is connected to a source of write current 19. The write current source may be part of the encoding circuitry (not shown). The signal encoding manifesting the binary coded digital information to be recorded may by accomplished in any of the well known types of systems. Preferably, a non-return to zero type of encoding may be employed. Such types of recording as NRZ, NRZI and phase encoding are well known in the art, and, therefore, it is not considered to be necessary to explain them any further.

Figure 2:
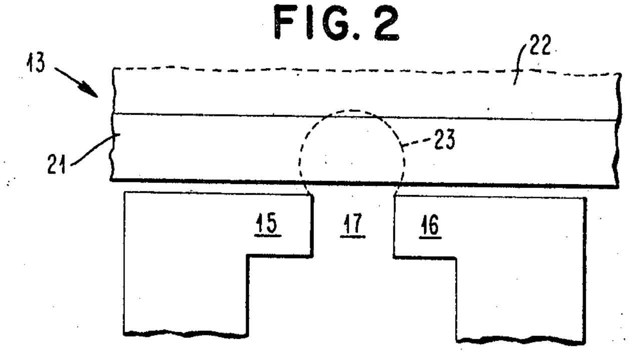
FIG. 2 is an enlarged side view of FIG. 1 illustrating a portion of the recording head and the record medium.

As shown in FIG. 2, the tape 13 employed in the recording apparatus may be the conventional or standard type of oxide tape which is presently employed in most computing systems. This tape is formed of an oxide recording surface 21 which is deposited on a Mylar base 22. The Mylar base is approximately 1.5 mils thick and the recording surface 21 is approximately 0.5 mil thick. The conventional tape is one-half inch in width and is capable of accommodating nine tracks of information.

In the conventional type of recording system employing standard oxide coated tape, the pole pieces 15 and 16 define a gap 17 that is usually about 500 microinches in length. With such a large gap head, it is not possible to accomplish reliable high density information storage. The magnetic flux generated at the gap fringes out through the entire recording surface 21 in a total saturating mode. This type of recording operation is illustrated by the flux line 23. With such a recording operation, it is virtually impossible to achieve storage densities in excess of 800 flux changes per inch without controlling the depth of saturation by varying the amplitude of the write current. As previously stated, this type of operation is beset by numerous signal response problems.

In the recording apparatus of this invention, the extent of saturation of the recording surface 21 is controlled to increase the information storage density. With all other parameters of the recording apparatus (that is, tape speed, tension on the tape, coercivity of the recording surface, constituency of the magnetic pole pieces and level of applied write current signal) maintained the same as in conventional recording apparatus, the control of recording surface saturation is accomplished by substantially reducing the length of the recording head gap 17 in relation to the thickness of surface 21. The level of applied write current supplied from source 19 to the coil 18 is sufficient to generate a particular level of magnetic flux across the gap 17. Dependent on the coercivity of the recording surface, this level is sufficient to cause storage of information. However, with the apparatus of the invention, the flux distribution is confined within narrower limits than in the conventional apparatus. Penetration is not made through the complete recording surface, but only to a limited extent thereby preventing total saturation.

Figure 3:
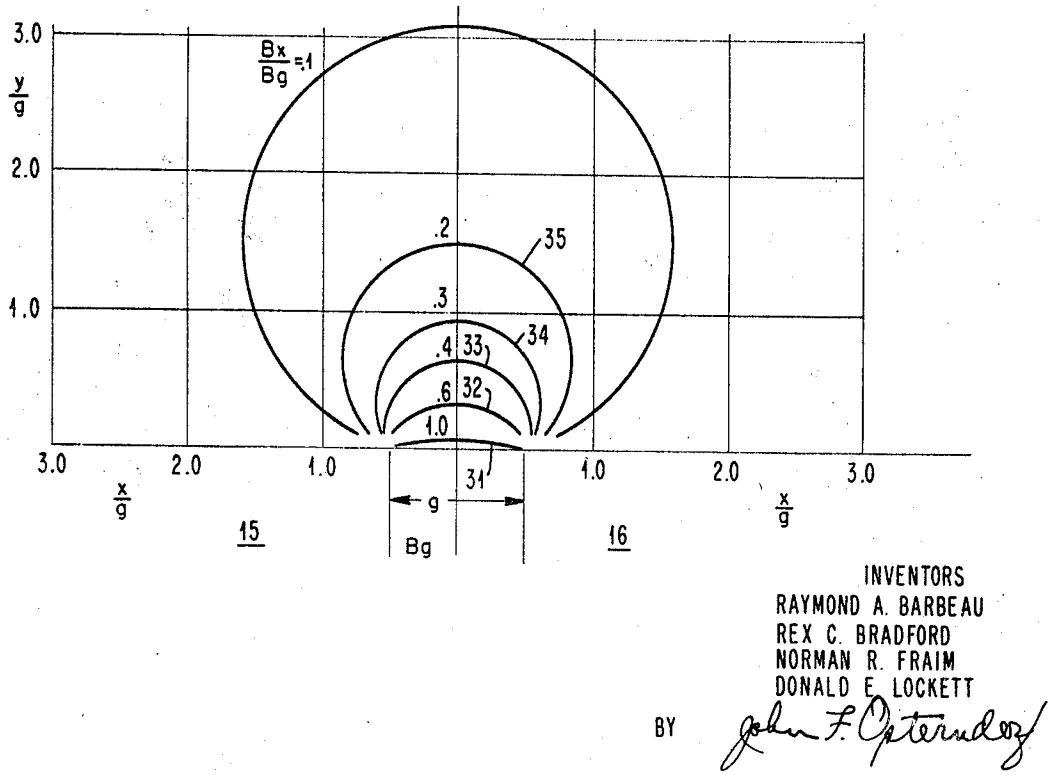
FIG. 3 is a generalized diagram showing the lines of horizontal flux density and their relationship to the transducing gap of the recording head.

Referring to FIG. 3, a generalized diagram illustrates the extent of recording surface saturation with distance from the head gap. The length of the gap is $g$, the distance from the pole pieces $y$ and the distance from the center of gap $x$. As is readily apparent, the line 31 between the tips of the two pole pieces has the greatest flux density B (indicated as 1.0 of B$g$). As the distance from the pole pieces 15–16 increases (lines 32, 33, 34 and 35), the flux density decreases. Thus, in a recording surface, at one gap length away from the pole piece, the ratio of the flux density at that point to the flux density at the center of the gap is approximately three-tenths (line 34). At one and one-half time the gap length away from the pole piece (line 35), the flux density is approximately two-tenths of the original amount.

In the recording apparatus of the invention, the same level of flux is generated at the gap 17 as in the conventional apparatus. Even though the same level of flux is necessary to accomplish recording, this level is available closer to the pole pieces, since the gap size prevents the fringing out of the flux limiting the depth of penetration, and therefore, the extent of recording surface saturation. Since the fringing is reduced, flux interferences between adjacent information bits (flux changes) is similarly reduced, and the density of storage increased.

The standard oxide tape (.0005 inch in thickness) has a coercivity of about 250 oersteds. If a write current of 25 milliamps is employed to generate the flux approximately a 4,000 gauss flux density is generated at the gap 17. At a depth of penetration of 1.5 gap lengths away from the pole pieces (refer to FIG. 3) about two-tenths of the original flux density is available to saturate the storage medium. Two-tenths of 4,000 gauss is 800, or approximately two to three times greater than the field strength of the tape. This is sufficient to change the orientation in the recording surface and, therefore, to store information.

Using a recording head having a gap 17 with a conventional length of 500 microinches, substantially more of the recording surface is saturated than if a head with a shorter gap length is employed. It has been determined that a head with a gap length of about one-fifth the thickness of the recording surface permits the recording densities to be increased to 1600 and 3200 flux changes per inch. A gap length range has been determined for this high density type of operation. The range is 0.1 to 0.5 of the recording surface thickness.

Figure 4:
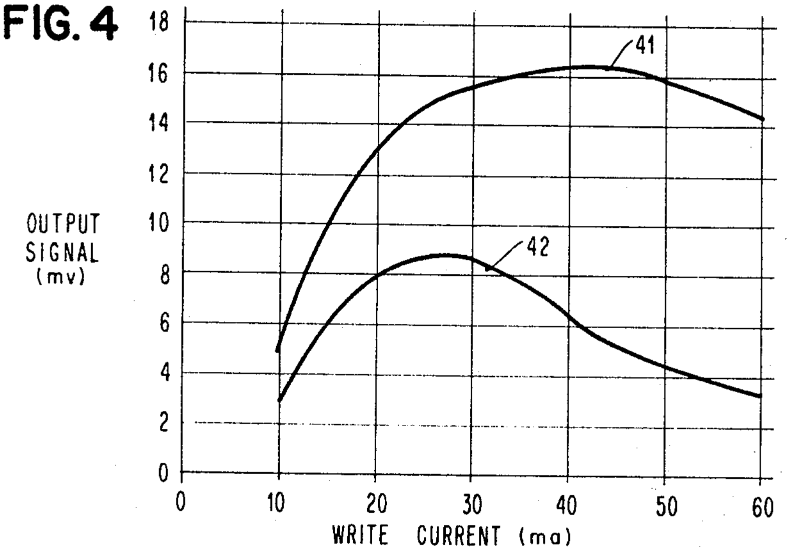
FIG. 4 is a write current versus output signal graph showing the comparative saturation relationships for two different high densities of recording.

It has also been determined that with the recording apparatus of the invention a greater flat portion was obtained in the write current versus signal output characteristic. Thus, as shown in FIG. 4, for writing densities of 1500 and 3000 flux changes (lines 41 and 42 respectively) per inch, a substantially flat portion was obtained between twenty-five and thirty-five milliamps of current. This characteristic of write current versus output signal and the provision of the substantially flat portion in this saturation curve enables the same recording head to be used for a multiple number of recording densities by keeping the write current constant and by simply varying its frequency.

Figure 5:
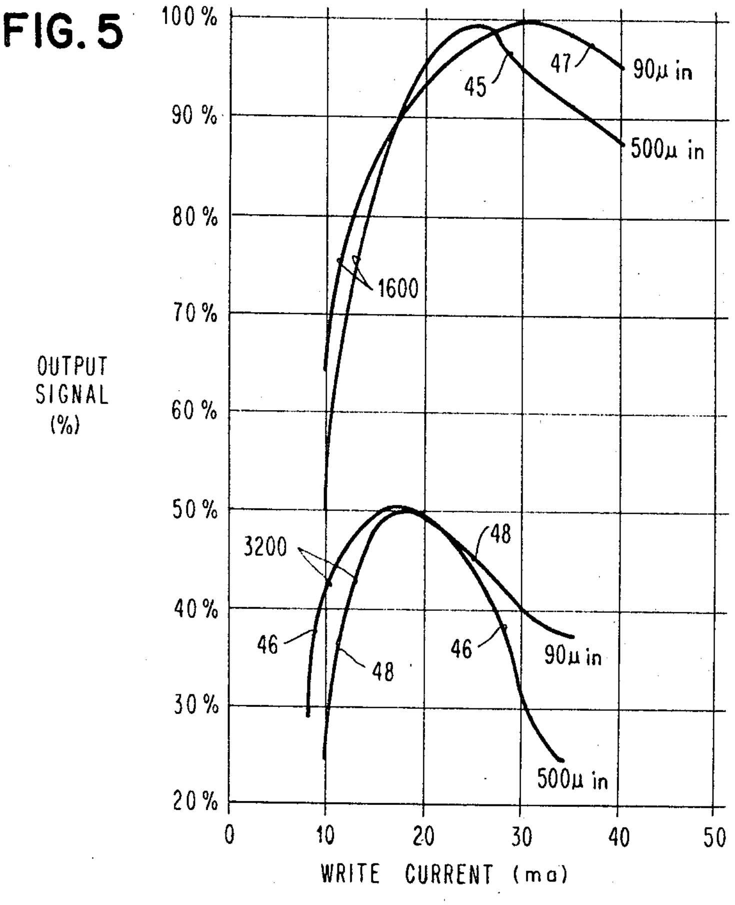
FIG. 5 is a graph of write current versus percent of output signal comparing a recording head with a conventional structure and one embodying the principles of this invention.

The relationship of these parameters is contrasted in FIG. 5 for a head having a gap of 500 microinches in length (lines 45, 46) and the head of the present invention having a gap length of 90 microinches (lines 47–48) the inventive recording apparatus provides a substantially flatter portion for both write densities of 1,600 and 3,200 bits per inch, thus enhancing the operating performance of this system.

Of a similar nature, are the phase shift results obtained from the detected peaks of the output signals obtained from recording systems using these two types of heads. In a system using a write current of 25 milliamps with a recording head having a transducing gap that is five-tenths of a mil in length, an average phase shift of approximately 4.5 microseconds was obtained. This is contrasted with a recording system using the apparatus of the invention wherein the phase shift approximated 3.5 microseconds, or substantially approximating that which can be accommodated in the detecting apparatus.

The recording apparatus as described permits digital information to be stored at much higher densities on conventional oxide coated tape than has been heretofore possible, using any of the known techniques including the altering of the amplitude of the write current. It enables the large volumes of tape currently in use to store considerably more data simply by altering the head that is in the recording apparatus rather than by changing any circuitry, tape transport apparatus, or any other means.

While the invention has been particularly shown and described with reference to a preferred embodiment thereof, it will be understood by those skilled in the art that the foregoing and other changes in form and details may be made therein without departing from the spirit and scope of the invention. For example, although the principles of the invention have been described as being used with a particular type of magnetic tape, it is apparent that it can be used with any other type of tape or disc or drum surfaces.

What is claimed is:

1. Apparatus for recording binary coded digital information on a magnetic record medium at densities higher than that density which the medium is capable of storing under full thickness saturation-type recording conditions, comprising a record medium having a recording surface of predetermined thickness, recording means for effecting controlled saturation recording in the surface when the medium moves relatively to the recording means, the recording means comprising a magnetic head formed of pole pieces which define a transducing gap of predetermined length therebetween, the length of the gap being dimensioned to be substantially smaller than the thickness of the recording surface and to limit the depth of saturation of the recording medium which currents supplied to the head are capable of producing to a depth less than the full thickness of the recording medium, and means for supplying current to the magnetic head for determining the magnetic flux generated at the gap of the head, said current being sufficient to produce a magnetization providing a substantially maximum output signal during playback.

2. Apparatus in accordance with claim 1 wherein the length of the gap is in the range 0.1 to 0.5 of the thickness of the recording surface, thereby controlling the extent of saturation of the recording surface by the flux generated at the gap.

3. Apparatus in accordance with claim 1 wherein the record medium has a recording surface of approximately .0005 inch thickness, and the gap has a length of equal to or less than approximately .0001 inch.

4. Apparatus for recording binary coded digital information manifested as phase encoded signals at densities above 800 bits/inch, comprising a record medium having a recording surface of approximately .0005 inch thickness, and recording means for effecting controlled saturation recording to a depth in the range of .130 to .180 microinch in the surface when the medium moves relatively to the recording means, the recording means comprising a magnetic head formed of pole pieces which define a transducing gap therebetween, and means for phase encoding the digital information for supplying a substantially constant amplitude of current to the magnetic head for determining the magnetic flux generated at the gap of the head, the gap having a length of approximately .0001 inch so as to confine the fringing of the flux generated at the gap to said range thereby controlling the extent of saturation of the recording surface.

References Cited

UNITED STATES PATENTS

| | | | |
|---|---|---|---|
| 2,839,613 | 6/1958 | Greene | 179—100.2 |
| 3,064,087 | 11/1962 | Gabor | 179—100.2 |
| 3,105,965 | 10/1963 | Joannou | 340—174.1 |
| 3,171,903 | 3/1965 | Wheeler | 346—74 |

OTHER REFERENCES

RCA TN No. 517, March 1962, "Magnetic Head," David C. Pastore.

June 30, 1961 edition of "Electronics" magazine, pp. 89–91, "Outside-Coil Magnetic Head Improves High Frequency Recording," by Camras and Sears.

BERNARD KONICK, *Primary Examiner.*

VINCENT P. CANNEY, *Assistant Examiner.*

U.S. Cl. X.R.

179—100.2; 340—174.1

PO-1050
(5/69)

UNITED STATES PATENT OFFICE
CERTIFICATE OF CORRECTION

Patent No. 3,449,756 Dated June 10, 1969

Inventor(s) Raymond A. Barbeau et al

It is certified that error appears in the above-identified patent and that said Letters Patent are hereby corrected as shown below:

Column 6, line 19, the phrase ".130 to .180" should read --130 to 180--.

SIGNED AND
SEALED
FEB 3 1970

(SEAL)
Attest:

Edward M. Fletcher, Jr.
Attesting Officer

WILLIAM E. SCHUYLER, JR.
Commissioner of Patents